US012476074B2

United States Patent
Straka et al.

(10) Patent No.: US 12,476,074 B2
(45) Date of Patent: Nov. 18, 2025

(54) CHARGED PARTICLE SENSORS INCLUDING WIDE BANDGAP MATERIALS

(71) Applicant: FEI Company, Hillsboro, OR (US)

(72) Inventors: Branislav Straka, Brno (CZ); Jan Lásko, Zatcany (CZ); Libor Novák, Brno (CZ); Vojtěch Mahel, Boršice u Blatnice (CZ); Radek Smolka, Březina (CZ); Petr Glajc, Brno (CZ)

(73) Assignee: FEI COMPANY, Hillsboro, OR (US)

( * ) Notice: Subject to any disclaimer, the term of this patent is extended or adjusted under 35 U.S.C. 154(b) by 422 days.

(21) Appl. No.: 18/065,438

(22) Filed: Dec. 13, 2022

(65) Prior Publication Data

US 2024/0194442 A1    Jun. 13, 2024

(51) Int. Cl.
*H01J 37/28* (2006.01)
*H01J 37/141* (2006.01)
(Continued)

(52) U.S. Cl.
CPC ............ *H01J 37/28* (2013.01); *H01J 37/141* (2013.01); *H01J 37/244* (2013.01); *H01J 37/265* (2013.01); *H01J 2237/24475* (2013.01)

(58) Field of Classification Search
CPC ........ H01J 37/28; H01J 37/141; H01J 37/244; H01J 37/265; H01J 2237/24475;
(Continued)

(56) References Cited

U.S. PATENT DOCUMENTS 5,021,663 A * 6/1991 Hornbeck ............... G01J 5/023
                                                              250/342
7,151,881 B2 * 12/2006 West ..................... H10F 30/223
                                                              372/64
(Continued)

FOREIGN PATENT DOCUMENTS

CN      111613679 A      9/2020
EP      2942801 A1      11/2015
(Continued)

OTHER PUBLICATIONS

Bodie et al. "Electron Spectroscopy with a Diamond Detector," Applied Radiation and Isotopes, Feb. 2002, vol. 180, 9 pages.
(Continued)

*Primary Examiner* — David A Vanore
(74) *Attorney, Agent, or Firm* — Leron Vandsburger

(57) ABSTRACT

Charged particle microscopy systems, sensors, and techniques are provided. A charged particle sensor can include a housing, configured to be incorporated into a scanning electron microscope (SEM). The charged particle sensor can include a detector cell, mechanically coupled with the housing. The detector cell can include an acceptor layer including a semiconducting material characterized by a bandgap equal to or greater than about 2.0 eV. The acceptor layer can define a first surface and a second surface opposing the first surface. The detector cell can include a first conducting layer disposed on the first surface, a second conducting layer disposed on the second surface, a first contact, electrically (Continued)

coupled with the first conducting layer, and a second contact, electrically coupled with the second conducting layer.

20 Claims, 10 Drawing Sheets

(51) Int. Cl.
    *H01J 37/244*     (2006.01)
    *H01J 37/26*     (2006.01)

(58) Field of Classification Search
    CPC ....... H01J 2237/2001; H01J 2237/2802; H01J 37/10; H01J 37/20; H10F 30/301; H10F 77/14; H10F 30/10; H10F 77/12; G01N 23/20008; G01N 23/203; G01N 23/2251
    See application file for complete search history.

(56) References Cited

U.S. PATENT DOCUMENTS

| | | | |
|---|---|---|---|
| 11,035,899 B2* | 6/2021 | Chen | H01J 37/28 |
| 2005/0053347 A1* | 3/2005 | West | G02B 6/136 |
| | | | 385/40 |
| 2006/0113467 A1* | 6/2006 | Yagita | H01J 37/317 |
| | | | 250/290 |
| 2009/0101817 A1* | 4/2009 | Ohshima | H01J 37/28 |
| | | | 250/310 |
| 2011/0309236 A1* | 12/2011 | Tian | H10F 30/288 |
| | | | 257/E31.097 |
| 2015/0069234 A1* | 3/2015 | Gerling | H01J 37/244 |
| | | | 250/310 |
| 2019/0140120 A1* | 5/2019 | Ma | H10F 77/1246 |
| 2020/0274018 A1* | 8/2020 | Le Perchec | H10F 30/21 |
| 2020/0363469 A1* | 11/2020 | Chen | G01R 31/307 |
| 2024/0071710 A1* | 2/2024 | Wong | G01R 31/2601 |
| 2024/0194442 A1* | 6/2024 | Straka | H10F 77/14 |
| 2025/0069844 A1* | 2/2025 | Hlavenka | H01J 37/28 |
| 2025/0102451 A1* | 3/2025 | Mahel | G01N 23/203 |

FOREIGN PATENT DOCUMENTS

| | | | | |
|---|---|---|---|---|
| EP | 3021349 A1 | 5/2016 | | |
| WO | WO-2023084283 A1 * | 5/2023 | ............ | C30B 23/02 |

OTHER PUBLICATIONS

Deng et al. "EMPIX: A High Dynamix Range Diamond Pixel Detector for Ultra-fast Electron Diffraction and Microscopy" 2021 IEEE Nuclear Science Symposium and Medical Imaging Conference (NSS/MIC), 2021, 7 pages.

Morishita H., et al., "Electron Detection Performance of Diamond Avalanche Diode," Journal of Vacuum Science & Technology: Part B, Oct. 21, 2010, vol. 28, No. 6, XP012144289, pp. 1169-1172.

Sugiyama M., "Application of In Situ Heating SEM Observation for Characterization of Metal Microstructure," Scientific Instrument News, Sep. 1, 2021, vol. 17, XP093260848, 9 pages.

* cited by examiner

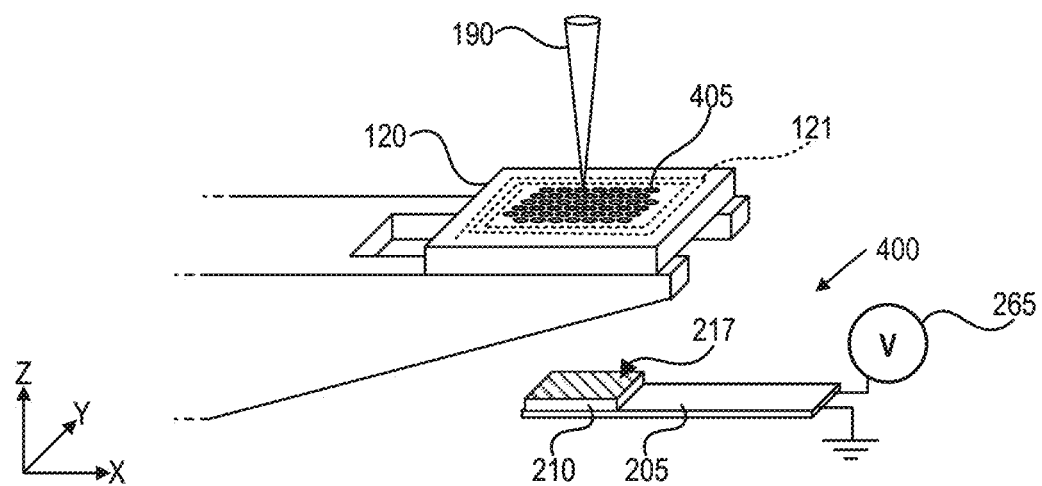
FIG. 4A
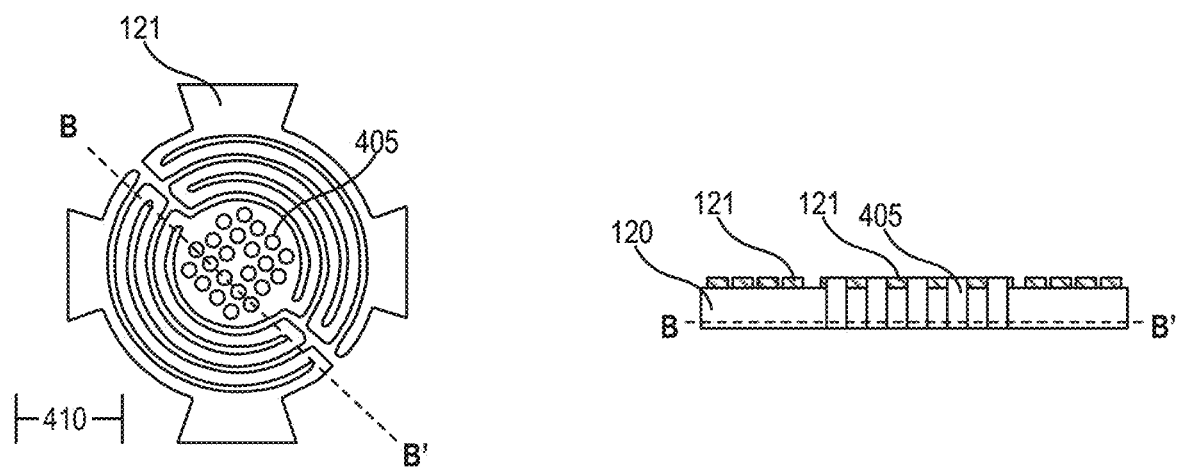
FIG. 4B
FIG. 4C

T = 308 K

T = 625 K

T = 913 K

T = 821 K

T = 1001 K

T = 373 K

T = 1426 K

T = 1473 K

CHARGED PARTICLE SENSORS INCLUDING WIDE BANDGAP MATERIALS

Embodiments of the present disclosure include electron microscopy components, systems, and methods. In particular, some embodiments are directed at sensor components configured for improved detection of backscattered electrons.

BACKGROUND

In charged particle microscopy, backscattered electrons (BSEs) are produced by the elastic scattering of a beam of electrons as the beam interacts with atoms of a sample. BSE signals are commonly used for elemental analysis in scanning electron microscope (SEM) systems. For example, BSE signals can be used to generate or enhance contrast in SEM images with brighter regions of the images corresponding to heavier elements. The contrast effect arises, at least in part, because the magnitude of a BSE signal depends on the atomic number of the atom, in addition to other operating parameters (e.g., beam current and accelerating voltage).

Thermal photons emitted by a heated sample and/or sample stage are energetic enough to induce the formation of electron-hole pairs in some semiconductor-based BSE detectors. For example, a photon having a wavelength shorter than 1127 nm, in the infrared spectrum, is energetic enough to generate electron-hole pairs in doped-silicon having a bandgap of about 1.1 eV. For a semiconductor having a bandgap of 2 eV, photons having a wavelength shorter than about 620 nm, in the visible spectrum, are energetic enough to generate electron-hole pairs. As a result, BSE signals are susceptible to noise arising from thermal photons, as well as other sources including but not limited to in-chamber illumination using visible-spectrum sources.

Existing solutions for thermal noise in heated stage SEM systems rely on aluminum-covered scintillator detectors, such as the Robinson-type detector. Such sensors operate by conversion of BSEs to photons, followed by conversion of photons to electrical signals via a photo-multiplier tube as is done in Everhart-Thornley detectors used for secondary electron detection. As such, BSE detectors for heated sample applications do not operate by the same physical mechanism as is used for silicon-based semiconductor detectors. Further, the aluminum covering one or more detectors (e.g., "n" detectors, where "n" is an integer) compatible with high sample temperatures renders scintillator detectors insensitive to BSEs having energies less than about 4 keV, limiting the operating range of BSE microscopy and microanalysis to exclude light elements and other sensitive samples. There is a need, therefore, for a charged particle sensor that is sensitive to BSEs having energies less than about 4 keV and does not detect infrared or visible photons as noise in BSE signals.

SUMMARY

In one aspect, a charged particle sensor includes a housing, configured to be incorporated into a scanning electron microscope (SEM). The charged particle sensor also includes a detector cell, mechanically coupled with the housing, the detector cell including an acceptor layer including a semiconductor material characterized by a bandgap equal to or greater than about 2.0 eV, the acceptor layer defining a first surface and a second surface opposing the first surface, a first conducting layer disposed on the first surface, a second conducting layer disposed on the second surface, a first contact, electrically coupled with the first conducting layer, and a second contact, electrically coupled with the second conducting layer.

The charged particle sensor may also include where the semiconducting material includes sp3 hybridized carbon, characterized by a concentration of impurities equal to or less than about 5 ppb.

The charged particle sensor may also include where the semiconducting material includes one or more materials selected from a group consisting of silicon carbide, single crystalline diamond, polycrystalline diamond, gallium nitride, gallium phosphide, cadmium sulfide, aluminum phosphide, zinc selenide, zinc sulfide, or aluminum nitride.

The charged particle sensor may also include where the housing is configured to be mechanically coupled with a pole piece of the SEM.

The charged particle sensor may also include where the housing is configured to be mechanically coupled with the SEM such that the charged particle sensor is disposed in a beam column of the SEM and oriented to detect backscattered electrons.

The charged particle sensor may also include where the acceptor layer is characterized by a thickness between the first conducting layer and the second conducting layer from about 10 µm to about 500 µm.

The charged particle sensor may also include being further configured to operate under a bias voltage from about 0.1 V to about 5 kV applied across the acceptor layer.

The detector cell can be insensitive to thermal photons emanating from a sample or a sample stage heated to a temperature greater than or equal to about 500 K.

The charged particle sensor may also include defining an aperture, where the detector cell is shaped to accommodate the aperture, and the aperture is characterized by a diameter from about 0.1 mm to about 5 mm.

The charged particle sensor may also include where the detector cell is a first detector cell, the sensor further includes a second detector cell, including a second acceptor layer includes the semiconductor material, the second acceptor layer defining a third surface and a fourth surface opposing the third surface, a third conducting layer disposed on the third surface and electrically isolated from the first conducting layer, and a third contact electrically coupled with the third conducting layer and electrically isolated from the first contact.

The charged particle sensor may also include where the first detector cell and the second detector cell are disposed in a concentric arrangement.

The charged particle sensor may also include where the detector cell is sensitive to backscattered electrons generated by an electron beam having an energy equal to or below about 30 keV.

In another aspect, a charged particle microscope system includes a vacuum chamber. The charged particle microscope system includes a sample stage disposed in the vacuum chamber, the sample stage being thermally coupled with a heating circuit. The charged particle microscope system includes a charged particle sensor including a detector cell, the detector cell including an acceptor layer including a semiconductor material characterized by a bandgap equal to or greater than about 2.0 eV, the acceptor layer defining a first surface and a second surface opposing the first surface, a first conducting layer disposed on the first surface, a second conducting layer disposed on the second surface, a first contact, electrically coupled with the first conducting layer, and a second contact, electrically coupled with the second conducting layer, where the first conducting layer is oriented toward the sample stage.

The microscope system may also include where the semiconducting material includes $sp^3$ hybridized carbon, characterized by an impurity concentration equal to or less than about 5 ppb.

The microscope system may also include where the semiconducting material includes one or more materials selected from a group consisting of silicon carbide, single crystalline diamond, polycrystalline diamond, gallium nitride, gallium phosphide, cadmium sulfide, aluminum phosphide, zinc selenide, zinc sulfide, or aluminum nitride.

The microscope system may also include further includes bias circuitry, electrically coupled with the first contact and the second contact and configured to apply a bias voltage from about 0.1 V to about 5 kV across the acceptor layer.

The microscope system may also include where the acceptor layer is characterized by a thickness between the first conducting layer and the second conducting layer from about 10 μm to about 500 μm.

The microscope system may also include further includes an objective lens disposed at least partially in the vacuum chamber, where the objective lens defines a beam axis between the sample stage and the objective lens, the beam axis further characterized by a scan angle over which the microscope system is configured to direct a beam of charged particles, the charged particle sensor defines an aperture, the detector cell is shaped to accommodate the aperture, and the aperture is characterized by a diameter from about 0.1 mm to about 5 mm.

The microscope system may also include further includes a beam column fluidically coupled with the vacuum chamber, where the charged particle sensor is disposed in the beam column.

The microscope system may also include further includes an objective lens disposed at least partially in the vacuum chamber, where the sample stage includes one or more windows, the windows being configured to be at least partially transmissive of charged particles having an energy above the bandgap of the semiconducting material, and the sample stage is disposed between the objective lens and the charged particle sensor. Other technical features may be readily apparent to one skilled in the art from the following figures, descriptions, and claims.

The microscope system may also include where the objective lens includes a pole piece, and where the charged particle sensor is mechanically coupled with the pole piece. Other technical features may be readily apparent to one skilled in the art from the following figures, descriptions, and claims.

The microscope system can be a dual-beam system including an electron beam source and an ion beam source. The microscope system can be a scanning electron microscope.

BRIEF DESCRIPTION THE DRAWINGS

The foregoing aspects and many of the attendant advantages of the present disclosure will become more readily appreciated as the same become better understood by reference to the following detailed description, when taken in conjunction with the accompanying drawings.

FIG. 4A is a schematic diagram of an example charged particle sensor configured to be disposed in a charged particle microscope and oriented to detect charged particles transmitted through a sample, in accordance with some embodiments of the present disclosure.

FIG. 4B is a schematic diagram of an example heating circuit configured for the system illustrated in FIG. 4A, in accordance with some embodiments of the present disclosure.

FIG. 4C is a schematic diagram of an cross section of the example sample holder illustrated in FIG. 4A along the B-B' axis in FIG. 4B, in accordance with some embodiments of the present disclosure.

Figures 7A, 7B:
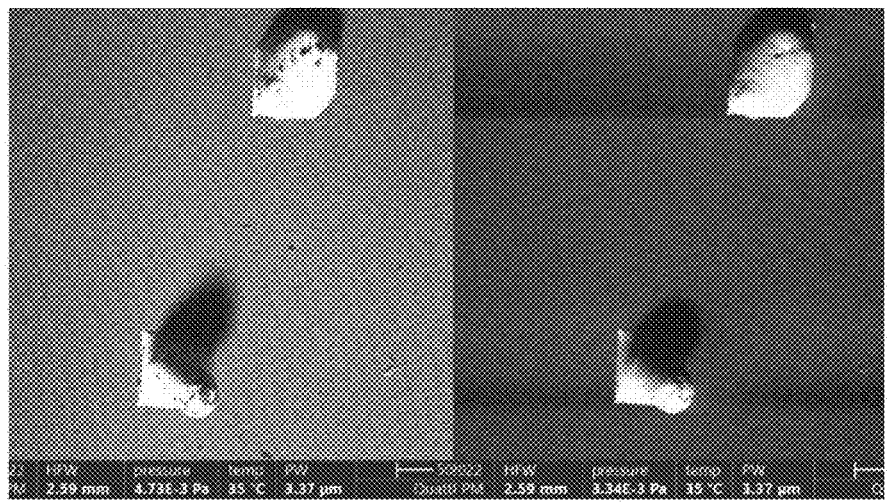
Figures 7C, 7D:
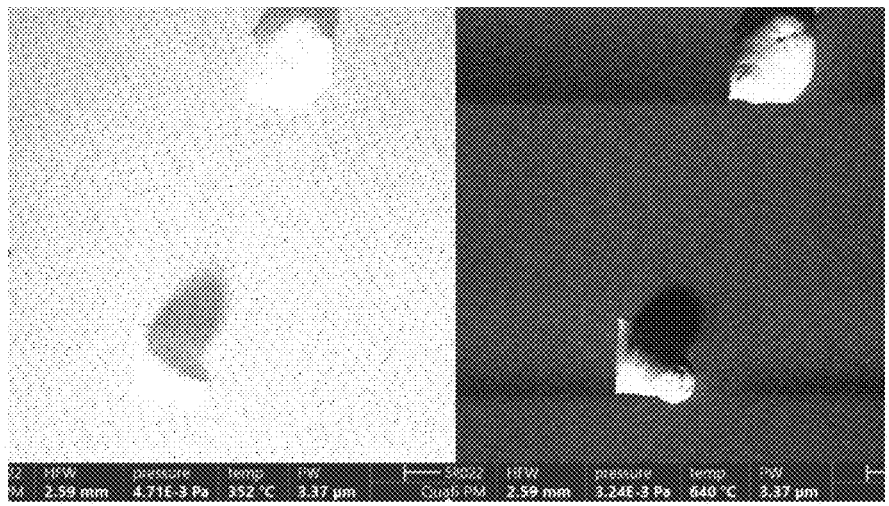
Figures 7E, 7F:

FIGS. 7A-7F present a series of electron microscope images generated in an SEM at several sample temperatures using a doped silicon detector (FIGS. 7A, 7C, and 7E) and an example charged particle sensor of the present disclosure (FIGS. 7B, 7D, and 7F).

Figures 8A, 8B:
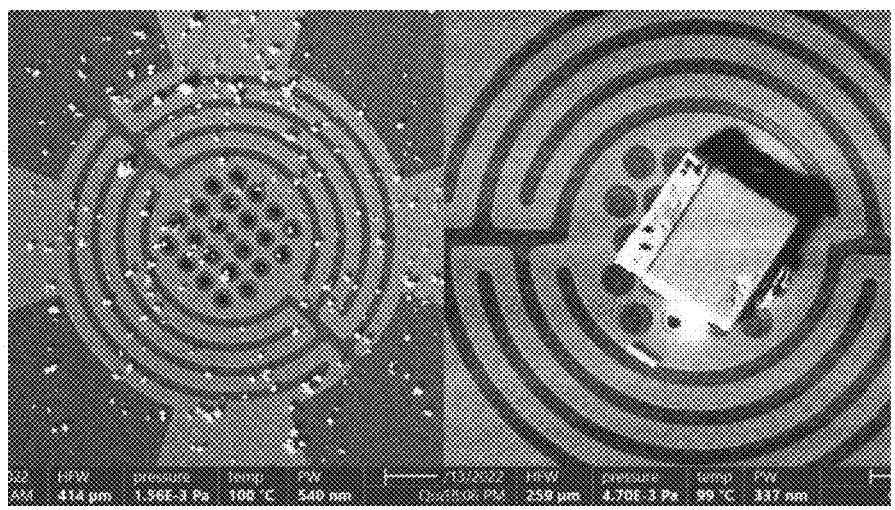
Figures 8C, 8D:
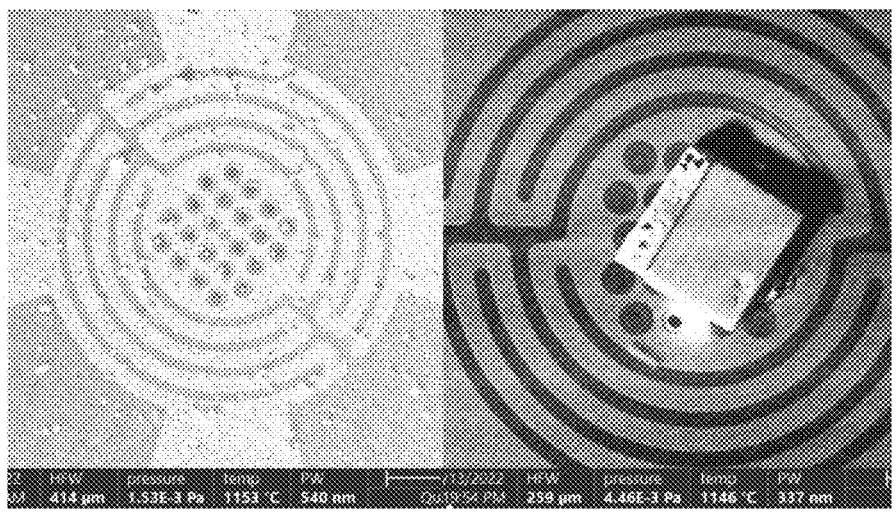
Figures 8E, 8F:
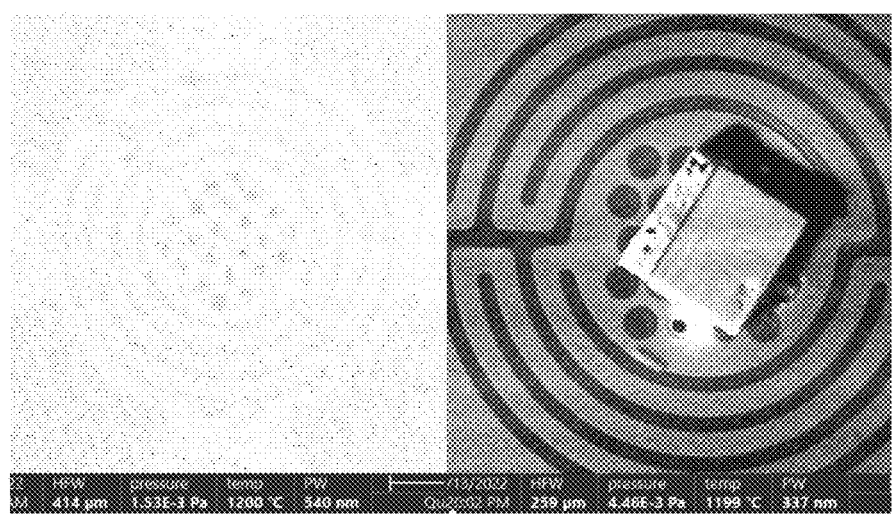

FIGS. 8A-8F present a series of electron microscope images generated in an SEM at several sample temperatures using a doped silicon detector (FIGS. 8A, 8C, and 8E) and an example charged particle sensor of the present disclosure (FIGS. 8B, 8D, and 8F).

Figure 9:
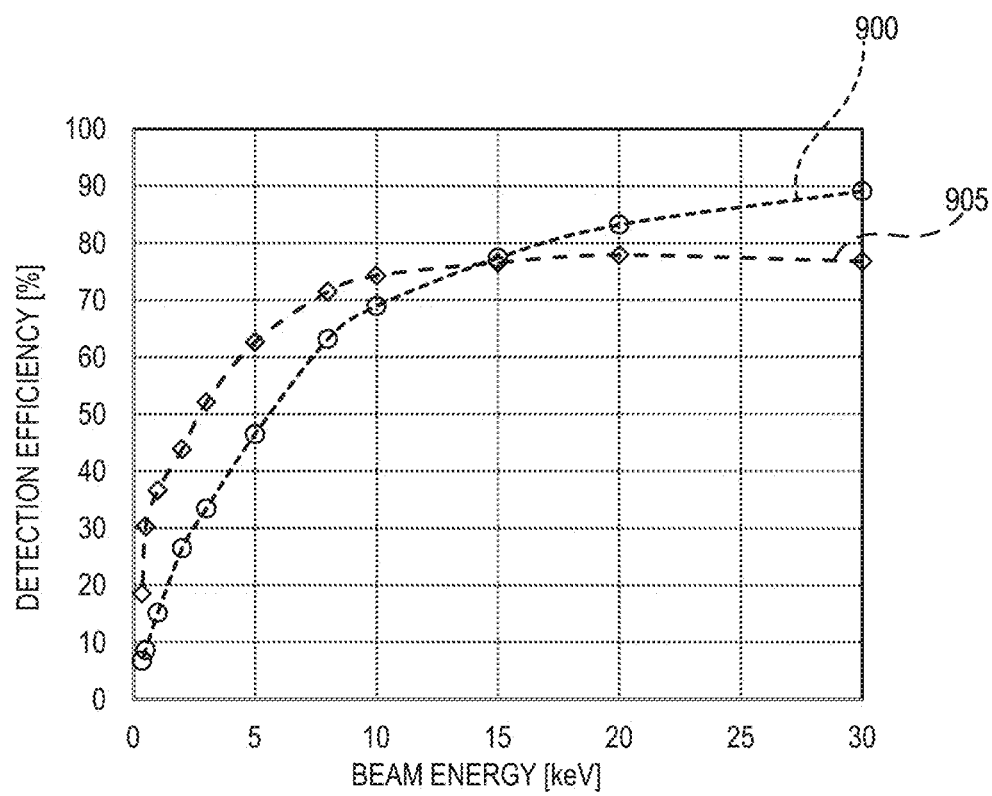

FIG. 9 is an efficiency plot illustrating the dependence of detection efficiency on beam energy for an example charged particle sensor, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While exemplary embodiments have been illustrated and described, it will be appreciated that various changes can be made therein without departing from the spirit and scope of the disclosure.

In charged particle microscopy, backscattered electrons (BSEs) are electrons that are produced by the elastic scattering of a beam of electrons as the beam interacts with atoms of a sample. BSE signals are commonly used for elemental analysis in scanning electron microscope (SEM) systems. For example, BSE signals can be used to generate or enhance contrast in SEM images with brighter regions of the images corresponding to heavier elements. The contrast effect arises, at least in part, because the probability that a BSE will be generated by a given electron-atom collision depends on the atomic number of the atom, in addition to other operating parameters (e.g., electron energy).

BSEs are emitted over an angular distribution from sample surfaces, which can be approximated by cosine distribution in cases for which the sample surface is perpendicular to the direction of the incident electron beam. BSEs are commonly detected using semiconductor sensors including a narrow bandgap material used as an acceptor layer, such as doped-silicon (having a bandgap of about 1.1 eV-2 eV). BSEs having an energy above the bandgap of the acceptor layer induce the formation of electron-hole pairs that are measurable as a BSE detector signal. In SEM imaging, the BSE detector signal is integrated over a period of time that is coordinated with a raster pattern of the beam of electrons. In this way, a BSE image is generated for a given region of the sample surface that includes relatively bright regions for heavier elements and relatively dark regions for lighter elements.

SEM microscopy and microanalysis of samples can also be conducted at elevated sample temperatures, where temperature dependency of physical or chemical properties of materials can be studied by heating a sample while in the SEM. Similarly, material processing, such as ion milling or sectioning, can benefit from heating a sample in the SEM. Sample heating is typically achieved by mounting the sample on a sample stage incorporating a resistive heating circuit.

Unfortunately, thermal photons emitted by the heated sample and/or sample stage are energetic enough to induce the formation of electron-hole pairs in semiconductor-based electron detectors. For example, a photon having a wavelength shorter than 1127 nm, in the infrared spectrum, is energetic enough to generate electron-hole pairs in doped-silicon having a bandgap of about 1.1 eV. For an acceptor layer having a bandgap of 2 eV, photons having a wavelength shorter than about 620 nm, in the visible spectrum, are energetic enough to generate electron-hole pairs. As a result, BSE signals are susceptible to noise arising from thermal photons, as well as other sources including but not limited to in-chamber illumination using visible-spectrum sources.

Existing solutions for thermal noise in heated stage SEM systems rely on aluminum-covered scintillator detectors, such as the Robinson-type detector. Such sensors operate by conversion of BSEs to photons that are conducted through a lightguide and then converted to electrical signals via a photo-multiplier tube as is done in Everhart-Thornley detectors. As such, BSE detectors for heated sample applications do not operate by the same physical mechanism as is used for silicon-based semiconductor detectors. Further, the aluminum covering renders scintillator detectors insensitive to BSEs having energies less than about 4 keV, limiting the operating range of BSE microscopy and microanalysis to exclude light elements and other sensitive samples. There is a need, therefore, for a charged particle sensor that is sensitive to BSEs having energies less than about 4 keV and does not detect infrared or visible photons as noise in BSE signals.

To that end, embodiments of the present disclosure include semiconductor-based charged particle sensors, charged particle microscope systems, and methods for generating BSE data from heated samples with negligible or no thermal artifact. Through inclusion of a wide-gap semiconducting material as an acceptor layer, having a bandgap above about 2 eV, charged particle sensors of the present disclosure can detect BSEs in SEM and/or FIB-SEM systems (e.g., focused ion beam and scanning electron microscope systems) that also use sample heating. In an illustrative embodiment, using diamond or diamond-like carbon as the acceptor layer, characterized by a bandgap of about 5.5 eV, charged particle sensors can be configured to detect BSEs with no thermal artifact up to a stage temperature of about 4100 K. In contrast, conventional narrow-gap silicon-based BSE detectors exhibit a thermal artifact above temperatures of about 300 K and significant sensor saturation above about 500 K.

Figure 1A:
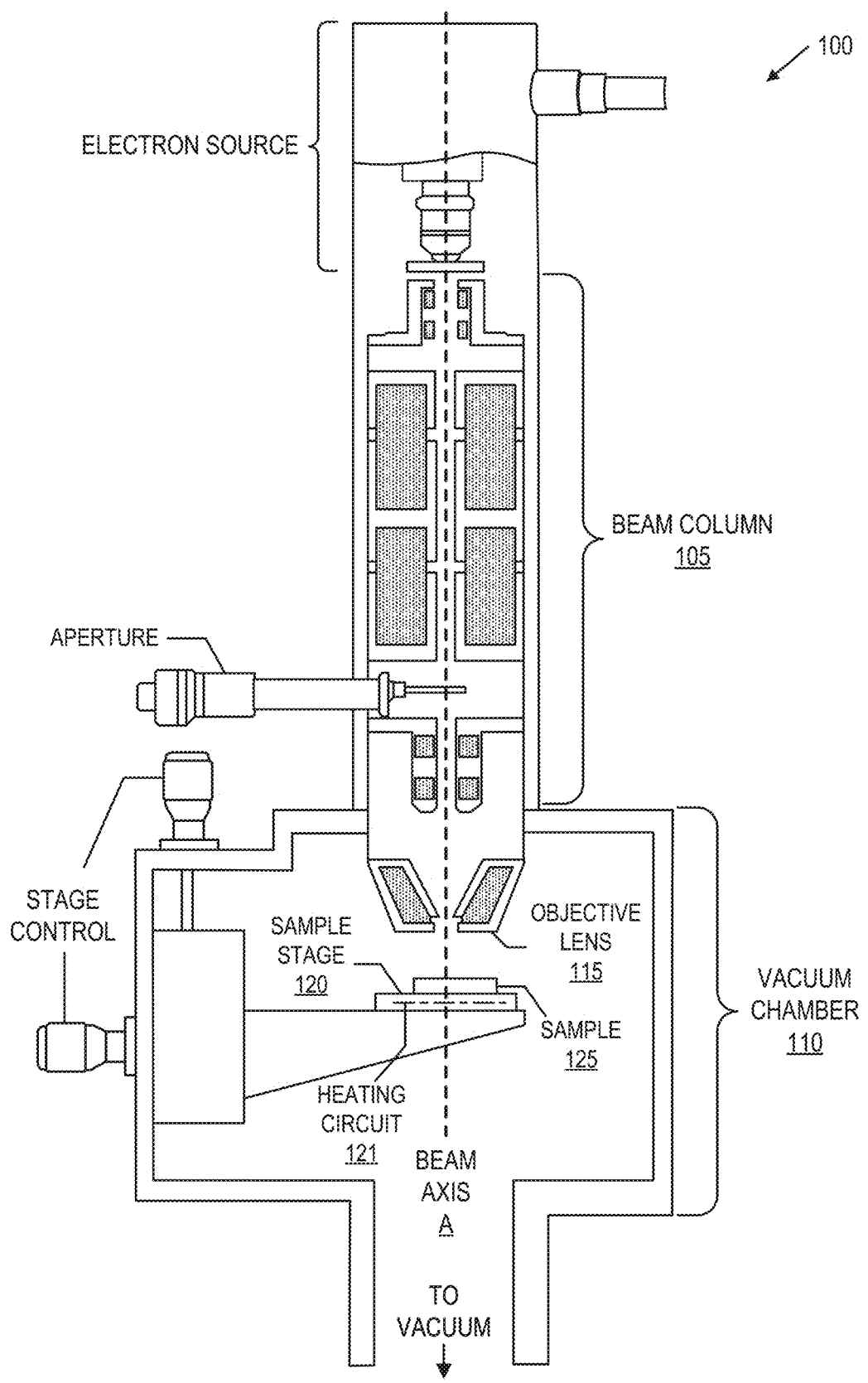
FIG. 1A is a schematic diagram of an example charged particle microscope, in accordance with some embodiments of the present disclosure.

FIG. 1A is a schematic diagram of an example charged particle microscope 100, in accordance with some embodiments of the present disclosure. Example charged particle microscope 100 includes multiple sections including an electron source, a beam column 105, and a vacuum chamber 110. The electron source includes high-voltage supply components, vacuum system components, and an electron emitter configured to generate a beam of electrons that is accelerated into the beam column 105. The beam column 105, in turn, includes electromagnetic lens elements that are configured to shape and form the beam of electrons from the electron source into a substantially circular beam with a substantially uniform profile transverse to a beam axis A, and conditions the beam to be focused onto a sample 125 by an objective lens 115, as described in more detail in reference to FIG. 1B.

The beam of electrons is typically characterized by a beam current and an accelerating voltage applied to generate the beam, among other criteria. The ranges of beam current and accelerating voltage can vary between instruments and are typically selected based on material properties of the sample or the type of analysis being conducted. Generally, however, beams of electrons are characterized by an energy from about 0.1 keV (e.g., for an accelerating voltage of 0.1 kV) to about 50 keV and a beam current from picoamperes to microamperes.

Figure 1B:
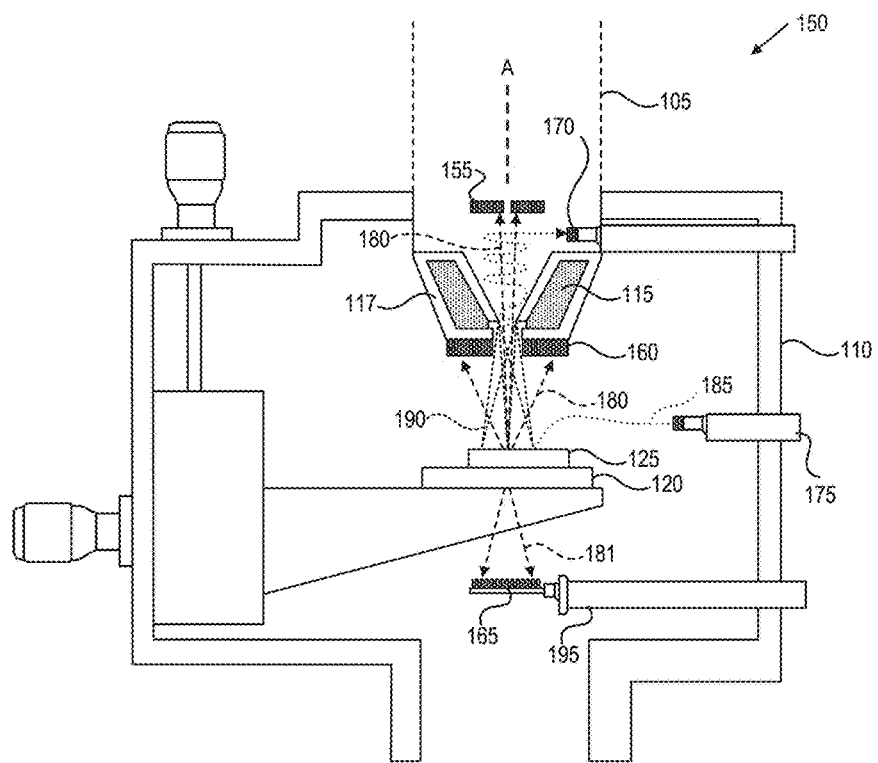
FIG. 1B is a schematic diagram illustrating the operation of the example charged particle microscope of FIG. 1A as a scanning electron microscope, including various detectors, in accordance with some embodiments of the present disclosure.

The vacuum chamber 110 and/or the beam column 105 can include multiple detectors for various signals, including but not limited to secondary electrons generated by interaction of the beam of electrons and the sample, x-ray photons (e.g., EDAX), other photons (e.g., visible and/or IR cameras), and/or molecular species (e.g., TOF-SIMS), as described in more detail in reference to FIG. 1B. The vacuum chamber 110 can also include a sample stage 120 that can be operably coupled with a multi-axis translation/rotation control system, such that the sample 125 can be repositioned relative to the beam axis A, as an approach to surveying and/or imaging the sample 125. As described in more detail in reference to FIG. 4A, the sample stage 120 can be thermally coupled with a heating circuit 121. Further the sample stage 120 can include windows permitting transmission of electrons or other charged particles through the sample and the sample stage. In this way, one or more charged particle sensors of the present disclosure can be disposed in the vacuum chamber 110 and/or in the beam column 105 and configured to detect BSEs emanating from the sample (e.g., reflected and/or transmitted), as described in more detail in reference to FIGS. 2A-2B.

Example charged particle microscope 100 is illustrated as a single-beam SEM instrument to focus description on applications of charged particle sensors of the present disclosure in detection of BSEs. In some embodiments, charged particle microscope 100 can incorporate an ion-beam source (e.g., a focused ion beam, or FIB) adapted, for example, to modify a sample or for microanalysis. In this way, charged particle sensors of the present disclosure can be configured to generate BSE data (e.g., images, line scans, etc.) in coordination with ion-sources used for modification and/or microanalysis of samples. In an illustrative example, a focused ion source (e.g., a p-FIB or the like) can be operably coupled with the vacuum chamber 110 and configured to incrementally remove portions of the sample 125 in a layer-wise manner. Between increments, BSE imaging of the sample 125 affords a depth profile of elemental information in the sample 125, which can be useful for quality assurance in semiconductor applications, as well as in other fields.

FIG. 1B is a schematic diagram illustrating the operation of the example charged particle microscope 100 of FIG. 1A as a scanning electron microscope, including various detectors, in accordance with some embodiments of the present disclosure. The detectors include a mirror detector (MD) 155, a pole-piece mounted detector (PMD) 160, a STEM mode detector (SMD) 165, as well as other detectors, such as a through-the-lens detector (TLD) 170 and an Everhart-Thornley detector 175. Not shown are other detectors and sources that can be coupled with the vacuum chamber 110 to augment the capabilities of the charged particle microscope 100, as an approach to focusing description on the configurations of charged particle sensors 155, 160, configured to detect BSEs 180, or forward scattered electrons in the case of SMD 165. To that end, embodiments of the present disclosure include charged particle microscopes including x-ray sources, x-ray detectors, ion-beam sources, mass spectrometers, optical sources (e.g., laser sources), or other sources as would be included in the complement of analytical instruments available for use in SEM microanalysis. Further, some configurations of BSE 180 detectors are contemplated, such as those As illustrated, the mirror detector 155 and the TLD detector 170 are disposed in the beam column 105 or in the objective lens 115. For example, the mirror detector 155 can be disposed above the objective lens 115 and oriented with a sensor surface facing the sample stage 120. Advantageously, the position of the MD 155 in the beam column 105 makes the MD 155 well suited for substantially flat samples 125 or samples for which the sample stage 120 can be reoriented such that the normal angle is substantially aligned with the beam axis A, as angular distribution of BSE 180 emission is highest at the normal angle to the surface of the sample 125 in such cases. MD 155 is illustrated without a retaining member or other support structure in FIG. 1B in the interest of focusing description on the position of MD 155 relative to BSEs 180, microscope 100 components, and the sample 125. In some embodiments, MD 155 is mounted on a retractable support 195, as illustrated in SMD 165. In this way, MD 155 can be introduced into position in the beam column 105 and/or objective lens 115 when a BSE 180 imaging/analysis mode is initiated by a user of charged particle microscope 100 and subsequently retracted from the position. In some embodiments, MD 155 is mechanically coupled with components of the beam column 105 and/or objective lens 115 and remains in position when not in use.

Pole-piece mounted detector 160 can be mechanically coupled with a pole-piece 117 housing the objective lens 115 and oriented with the collector surface facing toward the sample stage 120. As described in more detail in reference to FIGS. 3A-3C, PMD 160 can be segmented into multiple detectors, such as dipole, tripole, quadrupole, octopole, or other configurations (e.g., combinations of quadrant and concentric configurations). In this way, PMD 160 can compensate for angular distributions centered about a non-zero angle relative to the beam axis A, for example, resulting from surface topography. As which MD 155, PMD 160 can be mounted on a retractable support 195 instead of being mechanically coupled with the pole piece 117. Advantageously, mounting PMD 160 on the retractable support 195 permits the PMD 160 to be removed from between the sample stage 120 and the pole piece 117, allowing other probes, sources, or components to be introduced into the same space (e.g., parabolic mirrors used for luminescence measurement/imaging).

STEM-mode detector 165 can be mechanically coupled with a retractable support 195 configured to introduce the SMD 165 into a position such that the sample stage 120 is between the objective lens 115/pole piece 117 and the SMD 165. As described in more detail in reference to FIG. 4A-4C, SMD 165 can be oriented such that the detector surface faces an underside of the sample stage 120. In this way, Forward Scattered Electrons (FSEs) 181 emanating from the sample 125 can reach the detector surface and generate characteristic signals used for imaging and/or microanalysis. In this context, charged particles 181 can include electrons that undergo inelastic or elastic collision with the sample 125 and are redirected through the sample rather than back toward the beam column 105, but can also include other types of particles (e.g., characteristic X-rays).

Figure 2A:
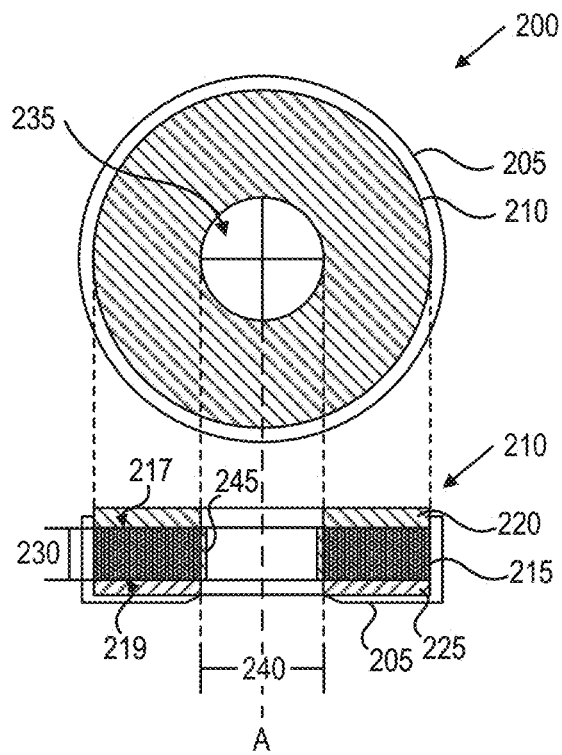
FIG. 2A is a schematic diagram of an example charged particle sensor, in accordance with some embodiments of the present disclosure.

FIG. 2A is a schematic diagram of an example charged particle sensor 200, in accordance with some embodiments of the present disclosure. The example charged particle sensor 200 is an example of the detectors described in reference to FIG. 1B, such as the MD 155, the PMD 160 and/or the SMD 165. As such, example charged particle sensor 200 includes a housing 205 and a detector cell 210. The detector cell 210 includes an acceptor layer 215, a first conducting layer 220, and a second conducting layer 225.

The housing 205 can be configured to be incorporated into a scanning electron microscope (SEM), as described in more detail in reference to FIGS. 1A-1B. The housing 205 can include mechanical fittings, couplings, and/or features corresponding to a given SEM system. For example, in a PMD 160 the housing 205 can include one or more through-holes disposed in the housing corresponding to the position of threaded bore-holes in the pole piece 117, facilitating mechanical coupling of the housing 205 with the pole piece 117. The pole piece 117 can be differently configured in different SEM systems. For example, some manufactures can omit some features in favor of others, such that the configuration of the housing 205 can be based at least in part on the charged particle microscope into which the housing 205 is to be incorporated. Similarly, the housing 205 can be configured for mechanical coupling with a support (e.g., retractable support 195 of FIG. 1B). As described in more detail in reference to FIG. 4A, the support can be a retractable arm permitting the example charged particle sensor 200 to be positioned to collect BSEs or other particles (e.g., photons, etc.). In this way, the support can include tilt and/or linear translation.

The detector cell 210 can be mechanically coupled with the housing 205, for example, by adhesive, retaining clips, or the like. The acceptor layer 215 can define a first surface 217 and a second surface 219. The second surface 219 is illustrated as opposing the first surface 217. The first conducting layer 220 can be disposed overlying the first surface 217. The second conducting layer 225 can be disposed overlying the second surface 219. In some embodiments, the first conducting layer 220 and/or the second conducting layer 225 can be or include a metal, a transparent conductive material, a conductive carbon film, and/or other conductive materials compatible with chemical vapor deposition, physical vapor deposition, epitaxy, or other techniques used to deposit conductive materials with controlled purity and thickness on the order of tens to hundreds of nanometers. To that end, first conducting layer 220 can be characterized by a substantially uniform thickness (e.g., limited by and within tolerances of the fabrication method) below a threshold at which the conductive material interferes with incident particles (e.g., as determined by simulation of interaction volumes between BSEs and the detector cell 210). The first conducting layer 220 can be disposed as a patterned film or patterned layer over the acceptor layer (e.g., in the shape of a grid or other geometric configuration) used to distribute the electrostatic field on the surface. In this case, the first surface 217 will not covered by material of 220 in the meshes of the grid, which may improve detection of some of the incoming particles.

The acceptor layer 215 can be characterized by a thickness 230 between the first conducting layer 220 and the second conducting layer 225 from about 10 µm to about 500 µm, including sub-ranges, fractions, and interpolations thereof. For example, the thickness 230 can be about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 300 µm, about 310 µm, about 320 µm, about 330 µm, about 340 µm, about 350 µm, about 360 µm, about 370 µm, about 380 µm, about 390 µm, about 400 µm, about 410 µm, about 420 µm, about 430 µm, about 440 µm, about 450 µm, about 460 µm, about 470 µm, about 480 µm, about 490 µm, or about 500 µm, including fractions and interpolations thereof. As described in more detail in reference to FIG. 1B, space constraints in the region between the sample stage 120 and the pole piece 117 militate against a larger value for the thickness 230. For example, contact between the sample stage and the charged particle sensor 200 can damage the first conducting layer 220 and/or the acceptor layer 215. In contrast, a smaller value for the thickness 230 can increase a probability that particles (e.g., a BSE) incident on the first surface 217 of the acceptor layer 215 will transit through the acceptor layer 215 without generating a detectable signal or will reduce the detector efficiency at higher particle energies (e.g., for BSEs approaching 30 keV). For at least these reasons, charged particle sensor 200 performance can be impaired below a thickness 230 of about 0.01 mm, and compatibility with various SEM systems can be impaired above a thickness 230 of about 500 µm.

In some embodiments, detector cell 210 and/or housing 205 define an aperture 235. The aperture can be included in the example charged particle sensor 200 to permit a beam of electrons (e.g., beam of electrons 190 of FIG. 1B) to pass through the housing 205 and/or the detector cell 210. While the nominal diameter of the beam of electrons can be on the order of tens of nanometers, electromagnetic interaction between the detector cell 210 and the beam of electrons can influence a value of a diameter 240 below which the beam is affected by the presence of the sensor 200 (e.g., the beam is deformed or at least partially blocked or interferes with the detector cell 210). For at least these reasons, the aperture 235 can be characterized by a diameter 240 from about 0.1 mm to about 5 mm, including sub-ranges, fractions, and interpolations thereof. For example, the diameter 240 can be about 0.1 mm, about 0.2 mm, about 0.3 mm, about 0.4 mm, about 0.5 mm, about 0.6 mm, about 0.7 mm, about 0.8 mm, about 0.9 mm, about 1.0 mm, about 2.0 mm, about 3.0 mm, about 4.0 mm, or about 5.0 mm, including fractions and interpolations thereof. As described in more detail in reference to FIG. 1B, angular distribution of particles of interest (e.g., BSEs) relative to the sample 125 surface can serve as constraints on the diameter 240 of the aperture 235. For example, in the case of a BSE sensor, BSE flux increases nearer to the beam axis A, such that sensor performance improves in general for smaller values of the diameter 240. In contrast, contact between the charged particle sensor 200 and the beam of electrons 190 can impair the functioning of the charged particle microscope system and/or the sensor 200. In this way, the diameter 240 can be limited by a lower threshold below which the charged particle sensor 200 interferes by with the operation of the charged particle microscope and by a general design consideration to reduce the diameter 240. Further scanning of the beam of electrons over a scan angle, illustrated in FIG. 1B, can increase the lower threshold based at least in part on geometric constraints influenced by the thickness 230 or the overall thickness of the sensor 200 (e.g., detector cell 210, housing 205, and other components).

In some embodiments, a conducting film 245 (e.g., gold, aluminum, etc.) can be disposed overlying an internal surface of the aperture. The conducting film 245 can be electronically coupled with the first conducting layer 220 or the second conducting layer 225, or can be electronically isolated from both the first conducting layer 220 and the second conducting layer 225. The conducting film 245 can be included as part of incorporating the example charged particle sensor 200 into the beam column 105, for example by shielding the acceptor layer from primary electrons 190, secondary electrons 185, or the like.

The detector cell 210 can be shaped to accommodate the aperture 235. In this context, accommodating the aperture 230 refers to the aperture 235 extending through the detector cell 210 and perforating the first conducting layer 220, the acceptor layer 215, and the second conducting layer 225, such that the detector cell 210 can be positioned around the beam axis, with the first conducting layer 220 oriented facing the sample stage 120, As described in more detail in reference to FIG. 1B. For example, charged particle sensor 200 configured as MD 155 or PMD 160 can include the aperture 235 with the detector cell shaped to accommodate the aperture 235. In contrast, the aperture 235 can be formed in the housing 205, rather than the detector cell 210 in configurations where the signal of interest emanates from the sample 125 at an angle between the beam axis A and the sample surface (e.g., a low-angle, grazing angle, or the like).

Example charged particle sensor 200 is shown in an annular form factor. Embodiments of the present disclosure include additional and/or alternative form factors, including but not limited to rectangular form factors or other polygonal form factors. Similarly, the schematic diagram of FIG. 2A is not intended to limit the geometric arrangement of constituent elements of example charged particle sensor 200. Example charged particle sensor 200 is illustrated in a concentric configuration, with aperture 235 being substantially centered in the detector cell 210. In some embodiments, however, the aperture 235 can be offset relative to a geometric center of the detector cell 210, for example, where the detector cell 210 is shaped to collect particles emanating from a specific angle relative to the beam axis A and/or across a range of angles that are not rotationally symmetrical about the beam axis A.

Figure 2B:
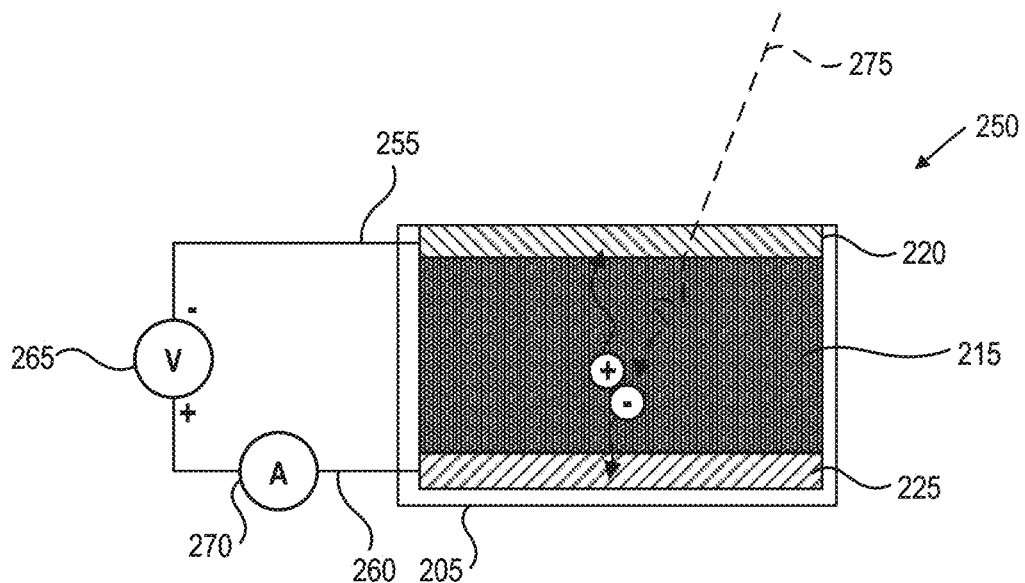
FIG. 2B is a schematic diagram of an example charged particle sensor, in accordance with some embodiments of the present disclosure.

FIG. 2B is a schematic diagram of an example charged particle sensor 250, in accordance with some embodiments of the present disclosure. Example charged particle sensor 250 includes detector cell 210 with acceptor layer 215, first conducting layer 220, and second conducting layer 225, mechanically coupled with housing 205, as described in reference to FIG. 2A. The example charged particle sensor 250 includes a first contact 255, a second contact 260, bias circuitry 265, and current measurement circuitry 270.

The first contact 255 is electrically coupled with the first conducting layer 220. The second contact 260 is electrically coupled with the second conducting layer 225. In this way, the example charged particle sensor 250 can be configured to apply a bias voltage across the acceptor layer 215. For example, bias circuitry 265 can be configured to apply a bias voltage across the acceptor layer 215 having a magnitude from about 0.1 V to about 5 kV, including sub-ranges, fractions, and interpolations thereof. In some embodiments, the magnitude of the bias voltage can be about 0.2 V, about 0.3 V, about 0.4 V, about 0.5 V, about 0.6 V, about 0.7 V, about 0.8 V, about 0.9 V, about 1.0 V, about 1.0 V, about 2.0 V, about 3.0 V, about 4.0 V, about 5.0 V, about 6.0 V, about 7.0 V, about 8.0 V, about 9.0 V, about 10.0 V, about 20 V, about 30 V, about 40 V, about 50 V, about 60 V, about 70 V, about 80 V, about 90 V, about 100 V, about 200V, about 300V, about 400V, about 500V, about 600V, about 700V, about 800V, about 900V, about 1.0 kV, about 1.5 kV, about 2.0 kV, about 2.5 kV, about 3.0 kV, about 3.5 kV, about 4.0 kV, about 4.5 kV, or about 5.0 kV, including fractions and interpolations thereof. Larger magnitudes of the bias voltage increase the likelihood that the charged particle sensor will interfere with the operation of the charged particle microscope (e.g., by forming local discharges or by deflecting and/or deforming the beam of primary electrons 190). In contrast, smaller magnitudes of the bias voltage can impair the performance of charged particle sensors of the present disclosure (e.g., by favoring electron-hole recombination).

Without being bound to a particular physical mechanism or phenomenon, charged particle sensors of the present disclosure can be configured to generate electrical signals in response to incidence of energetic particles 275 (e.g., BSEs 180 of FIG. 1A) onto the first surface 217 of the acceptor layer 215 (e.g., through orientation of the first conducting layer 220 toward the sample stage 120). Penetration of the energetic particles 275 into the acceptor layer can generate electron-hole pairs that can be separated and driven to respective conducting layers by force of the bias voltage. Current measurement circuitry 270 can be configured to integrate the current drawn from acceptor layer 215 and/or returned to the ground or relative ground over a period of time (e.g., coordinated with the scan pattern of the SEM as part of imaging or for a defined exposure time for spot-mode analysis). The magnitude of the bias voltage can be based at least in part on the thickness 230 of the acceptor layer 215, as an approach to improving detector efficiency (e.g., by reducing the probability of electron-hole recombination in the acceptor layer 215). In this way, the bias voltage can be proportional to the thickness 230, from about 0.1 V to about 100 V per μm of the thickness 230, including subranges, fractions, and interpolations thereof. In some embodiments, the bias voltage can be about 0.1 V per μm, about 0.5 V per μm, about 1.0 V per μm, about 2.0 V per μm, about 3.0 V per μm, about 4.0 V per μm, about 5.0 V per μm, about 6.0 V per μm, about 7.0 V per μm, about 8.0 V per μm, about 9.0 V per μm, about 10.0 V per μm, about 20.0 V per μm, about 30.0 V per μm, about 40.0 V per μm, about 50.0 V per μm, about 60.0 V per μm, about 70.0 V per μm, about 80.0 V per μm, about 90.0 V per μm, or about 100.0 V per μm, including interpolations and fractions thereof.

To facilitate the operation of charged particle sensors of the present disclosure with heated samples (e.g., up to and including local temperatures of about 4000 K), the acceptor layer 215 can be or include a semiconductor material characterized by a bandgap equal to or greater than about 2.0 eV. In some embodiments, the semiconductor material can be characterized by a bandgap from about 2.0 eV to about 6.5 eV, including sub-ranges, fractions, and interpolations thereof. To that end, the bandgap can be about 2.5 eV, about 3.0 eV, about 3.5 eV, about 4.0 eV, about 4.5 eV, about 5.0 eV, about 5.5 eV, about 6.0 eV, or about 6.5 eV, including fractions and interpolations thereof. In the context of heated sample imaging and microanalysis, a bandgap below about 2.0 eV can be susceptible to thermal noise from infrared and/or visible photons at temperatures of about 600 K or greater. In contrast, physical limits, fabrication process constraints, and other challenges associated with wide-gap materials can limit the applicability of band gap values above about 6.5 eV. In typical SEM operation, accelerating voltages can range from hundreds to thousands of volts (e.g., 0.1 kV to about 30 kV). Such conditions can generate BSEs having energies that are comparable to the average energy of primary electrons 190. In this way, the detector cell 210 is sensitive to backscattered electrons generated by an electron beam having an energy equal to or below 30 keV.

The material used for the acceptor layer 215 can be selected in line with criteria for bandgap, radiation hardness, and/or manufacturability. To that end, the semiconducting material of the acceptor layer 215 can be or include $sp^3$ hybridized carbon (e.g., diamond, diamond-like carbon, etc.). The $sp^3$ hybridized carbon can be characterized by a concentration of impurities equal to or less than about 5 ppb, which can also be referred to as "electronics grade." The $sp^3$ hybridized carbon can be synthesized as a conformal coating on various substrates by synthesis from dissociated carbon source gases (e.g., chemical vapor deposition), to form single crystal diamond, polycrystalline diamond, diamond-like carbon, or the like. In this way, the acceptor layer 215 can be characterized by at least a region of material having a bandgap of about 5.5 eV.

In some embodiments, the semiconducting material includes one or more materials selected from a group consisting of silicon carbide (2.86 eV), single crystalline diamond (5.5 eV), polycrystalline diamond (5.5 eV), gallium nitride (3.4 eV), gallium phosphide (2.26 eV), cadmium sulfide (2.42 eV), aluminum phosphide (2.45 eV), zinc selenide (2.7 eV), zinc sulfide (3.6 eV), or aluminum nitride (6.2 eV). The values provided describe the innate bandgap of the corresponding material, which can be modified through doping during synthesis to be higher or lower than the stated value. The bandgap can be an inherent property of a material, but can also be modified by doping with P-type or N-type dopants (e.g., doped silicon narrow-gap materials described in reference to FIGS. 5A-5B).

Example charged particle sensor 250, like example charged particle sensor 200, can be configured to be incorporated into example charged particle microscope 100 of FIGS. 1A-1B. Further, the components and/or materials of example charged particle sensor 250 can be included as part of example charged particle sensor 200, omitted from FIG. 2A and its accompanying description to focus on geometrical aspects. To that end, FIG. 2B is provided to describe electronic and material aspects of charged particle sensors of the present disclosure. In an illustrative example, sensor 250 can include the aperture 235 of example charged particle sensor 200. Similarly, example charged particle sensor 200 can include electronic components and semiconducting materials of sensor 250.

Figure 3A:
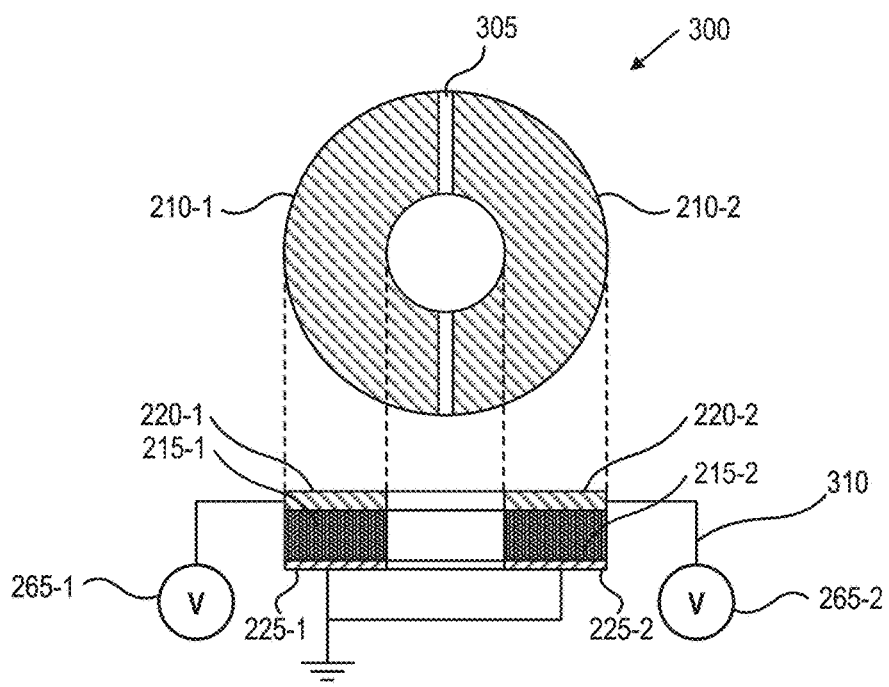
FIG. 3A is a schematic diagram of an example charged particle sensor including multiple segments, in accordance with some embodiments of the present disclosure.
Figure 3B:
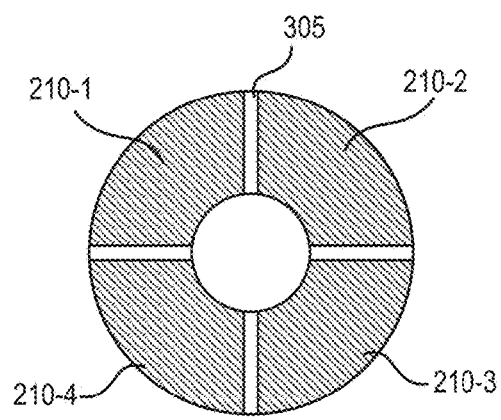
FIG. 3B is a schematic diagram of an example charged particle sensor including multiple segments in a quadrant arrangement, in accordance with some embodiments of the present disclosure.

FIG. 3A is a schematic diagram of an example charged particle sensor 300 including multiple segments, in accordance with some embodiments of the present disclosure. The sensor 300 can be an example of the sensors of FIGS. 2A-2B, in that sensor 300 can include the components, materials, and configurations described in reference to FIGS. 1A-2B. To that end, example charged particle sensor 300 includes a first detector cell 210-1, a second detector cell 210-2, first bias circuitry 265-1, and second bias circuitry 265-2.

Segmentation of the example charged particle sensor 300 into multiple detector cells can improve the performance of BSE detectors by addressing fabrication challenges related to sensor size, permitting differential signal processing methods for topographic imaging, as well as permitting different bias voltages to be applied to different detector cells 210 as an approach to improving detector efficiency. Examples of detector segmentation include a quadrant arrangement illustrated in FIG. 3B including a third detector cell 210-3 and a fourth detector cell 210-4 covering a substantially equal solid angle of BSE emission from the sample 125, and a concentric arrangement illustrated in FIG. 3C including a fifth detector cell 210-5 and a sixth detector cell 210-6. The concentric arrangement of FIG. 3C includes multiple concentric rings, of which some can be sub-divided (e.g., fourth, fifth, and sixth detector cells).

Figure 3C:
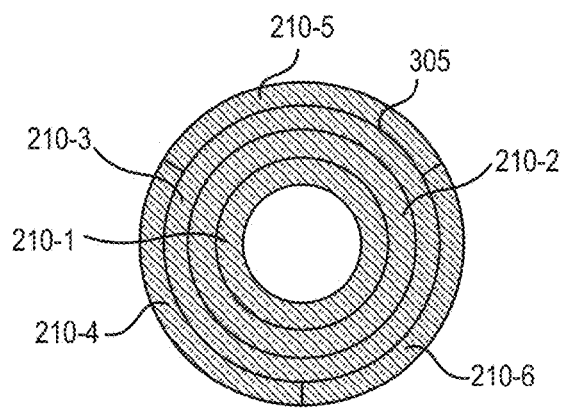
FIG. 3C is a schematic diagram of an example charged particle sensor including multiple segments in a concentric arrangement, in accordance with some embodiments of the present disclosure.

In some embodiments, the first detector cell 210-1 and the second detector cell 210-2 include respective acceptor layers 215-1 and 215-2 and conducting layers 220 and 225 as described in reference to FIG. 2B. Different segments of the example sensor 300 can be defined by patterned deposition of conductive material onto the respective first surfaces 217 and/or respective second surfaces 219 of a shared acceptor layer 215. Such a structure can give rise to crosstalk between detector cells 210, especially in cases where detector cells 210 are relatively narrow in the radial direction, as illustrated in FIG. 3C. To that end, detector cells 210 can be separated by isolation structures 305 and/or can be isolated by housing 205. Isolation structures can be or include materials selected to absorb BSEs and/or to reflect BSEs (e.g., using a relatively heavy element).

In some embodiments, a third conducting layer 220-2 (e.g., a "second-first conducting layer 220") is disposed on the first surface 217 of the second acceptor layer 215-2. Similarly a fourth conducting layer 225-2 (e.g., a "second-second conducting layer 225") can be disposed on the second surface 219 of the second acceptor layer 215-2. A third contact 310 can be electrically coupled with the third conducting layer 220-2 to couple the second bias circuitry 265-2 with the second detector cell 210-2. The third contact 310 can be electrically isolated from the first contact 255.

First bias circuitry 265-1 and second bias circuitry 265-2 can be mutually coupled to a shared power source and can be differentiated by switch and/or control circuitry to permit different bias voltages to be applied to respective detector cells 210. In an illustrative example, a positive bias can be applied to first detector cell 210-1 and a negative bias can be applied to second detector cell 210-2 with the same or similar magnitude. As such, the detector cells 210 included as part of sensor 300 can be electrically coupled with a shared ground or can be coupled with a respective relative ground.

FIG. 4A is a schematic diagram of an example charged particle sensor 400 configured to be disposed in a charged particle microscope and oriented to detect charged particles transmitted through a sample, in accordance with some embodiments of the present disclosure. Example charged particle sensor 400 is an example of SMD 165 of FIG. 1B, and can include materials, components, and structured of example sensors 200, 250, and 300 of FIGS. 2A-3C. To that end, example charged particle sensor 400 includes a first conducting layer 220 disposed on a first surface 217 of an acceptor layer 215, and is configured to detect charged particles, photons, etc., emanating from the sample 125, via one or more windows 405 formed in the sample stage 120.

As described in more detail in reference to FIG. 1B, the sample stage can be disposed between the objective lens and the charged particle sensor, and the example sensor 400 can be oriented such that the first surface 217 of the acceptor layer 215 faces the sample stage 220. The window(s) 405, being configured to be at least partially transmissive of charged particles having an energy above the bandgap of the semiconducting material, can thus permit the example sensor 400 to generate signals from incident particles (e.g., FSEs, photons, etc.).

FIG. 4B is a schematic diagram of an example heating circuit 121 configured for the system illustrated in FIG. 4A, in accordance with some embodiments of the present disclosure. The heating circuit 121 is illustrated as a resistive heating element being formed by patterned deposition onto a surface that can serve as the sample stage 125. As shown, the heating circuit 121 can include regions for contacting a power supply and can omit regions in such a way that window(s) 405 are unobscured. As overall resistance and/or heat generation can be path dependent, heating circuit 121 can be patterned to increase the total heat flux for a given surface area (shown in cross section in FIG. 4C). In some embodiments, heating circuit 121 can be formed from a material that absorbs photons and converts the absorbed photons into heat. In this way, heat can be provided to the sample stage 125 using electromagnetic radiation (e.g., infrared photons as a laser beam) rather than an electrical circuit that may influence the behavior of charged particles in the charged particle microscope. The dimension 410 is included to reflect that the heating circuit 121 can be sized for localized heating in a region of a sample, or for multiple different samples in a single sample holder. For example, the dimension 410 can be on the order of micrometers, millimeters, or centimeters.

Figure 5A:
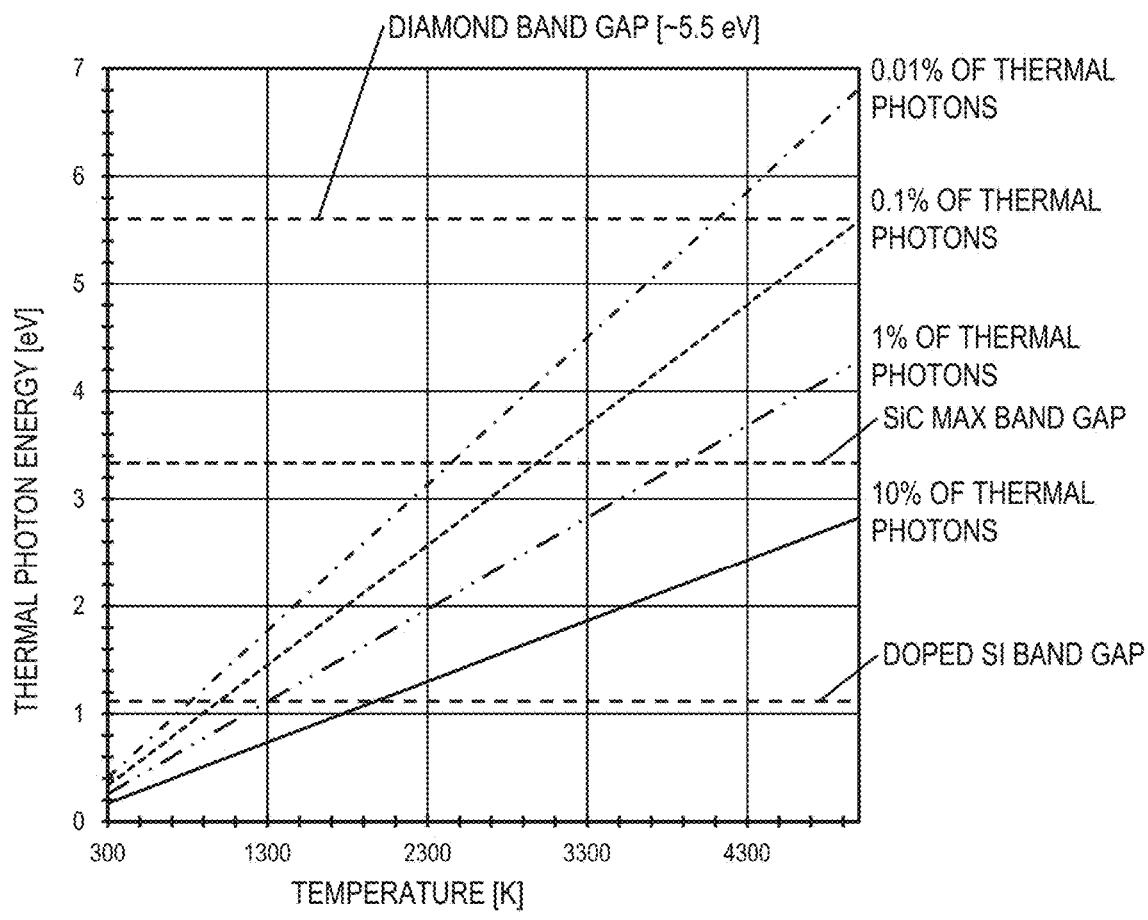
FIG. 5A is a sensitivity plot for various acceptor layer materials compared to energy distributions predicted using Wien's displacement law, in accordance with some embodiments of the present disclosure.
Figure 5B:
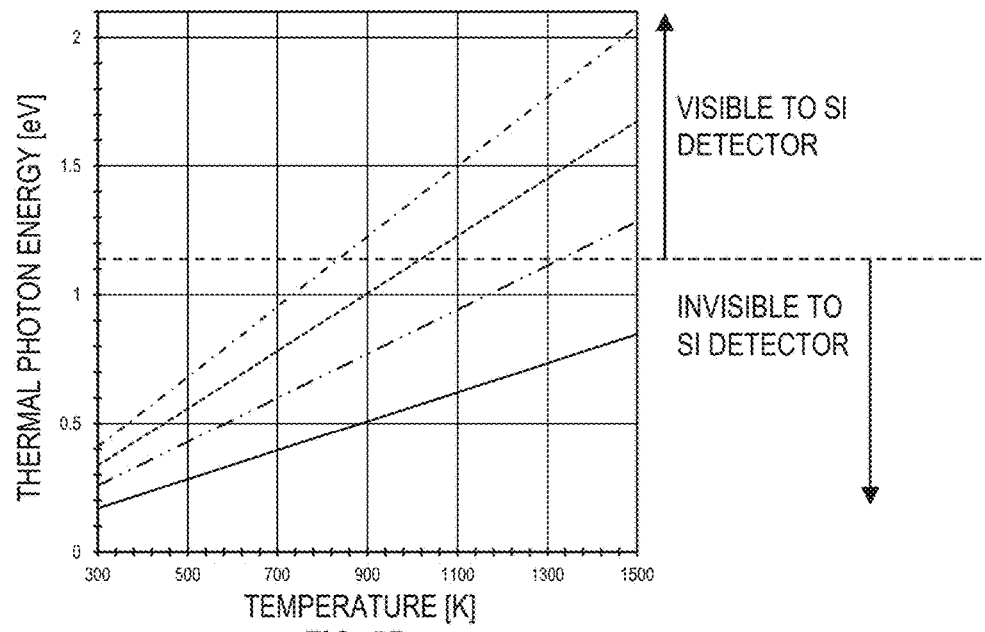
FIG. 5B is a sensitivity plot illustrating a section of the plot of FIG. 5A.

FIG. 5A is a sensitivity plot for various materials compared to energy distributions predicted using Wien's displacement law, in accordance with some embodiments of the present disclosure. The sensitivity plot, for which a region of temperature values from 300-1500 K is reproduced in FIG. 5B, plots infrared radiation emanating from a heated sample stage 120 and/or heated sample(s) 125 (applying a black body approximation) in comparison to bandgap information for selected materials including doped silicon, silicon carbide, and diamond. The ordinate is thermal photon energy in eV and the abscissa is temperature in Kelvin. Data for thermal photon energy are derived from Wien's displacement law, which assumed emission of thermal photons based on Planck's law. In this way, at a given temperature, different lines are plotted for the portion of total photons emitted having an energy at or above the corresponding energy. As an illustrative example, at about 1750 K, about 10% of thermal photons have an energy at or above 1 eV and about 0.1% of thermal photons have an energy at or above 2 eV.

FIGS. 5A and 5B illustrate that charged particle sensors of the present disclosure are configured to generate negligible or no thermal artifact from sample heating. For example, for a bandgap above 2 eV, sample(s) 125 and/or the sample stage 120 heating below about 1500 K will generate negligible or no thermal artifact (fewer than 0.01% of thermal photons having energy above the bandgap. In contrast, a doped silicon detector having a bandgap of about 1.1 eV is sensitive to more than 1% of thermal photons generated at 1500 K. Using diamond materials, having a bandgap of about 5.5 eV, charged particle sensors of the present disclosure are insensitive to thermal photons up to a sample/stage temperature of about 4100 K, based on the Wien's law prediction. In comparison, doped-silicon detectors are predicted to become sensitive to thermal photons at temperatures of about 820 K, as described in more detail in reference to FIGS. 6A-9.

Figure 6A:
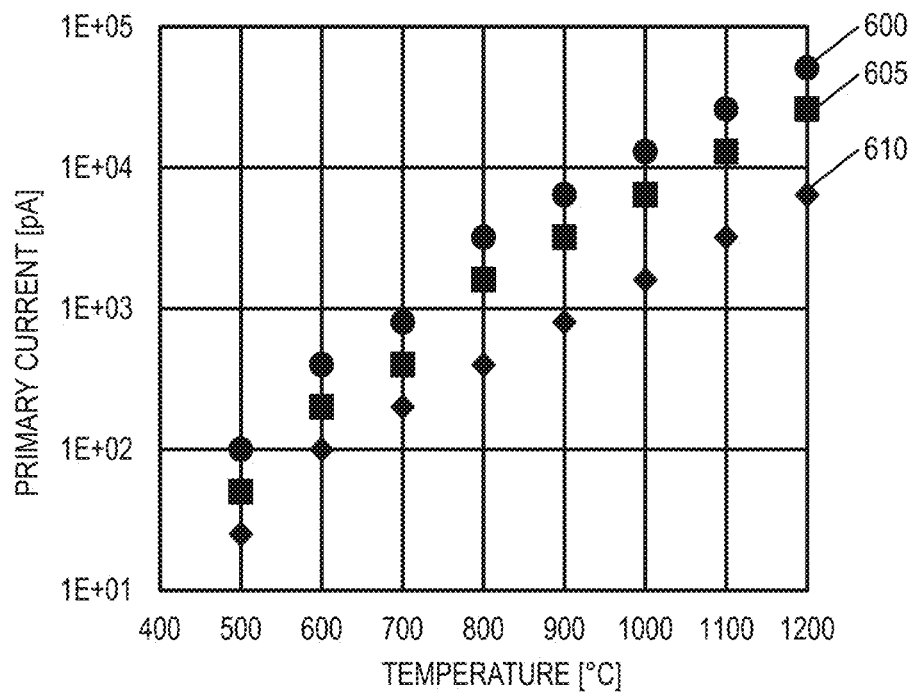
FIG. 6A is current plot illustrating the influence of sample temperature on the detected current in doped-silicon BSE detectors for various detector configurations.

FIG. 6A is a current plot illustrating the influence of sample temperature on detected signal in doped-silicon BSE detectors for various detector configurations. The data presented in the current plot of FIG. 6B were collected on a first SEM system, at 20 keV energy of the primary electrons for a series of operating temperatures. The data represent the beam current, plotted on the ordinate, above which the BSE signal for a given detector exceeds the thermal noise signal at a given temperature, plotted on the abscissa. Three data sets were collected for a series of temperatures between 500° C. and 1200° C. using a silicon-based BSE detector at a close position, referred to as the Concentric BackScattered (CBS) detector 600, using a silicon-based BSE detector at a middle position, referred to as the Mirror Detector (MD) detector 605, and using a silicon-based electron detector at a far position, referred to as the In Column Detector (ICD) detector 610. The detectors 600-610 were substantially aligned with the beam axis of the second SEM system, and were characterized by progressively narrower collection angles, centered about the beam axis.

Figure 6B:
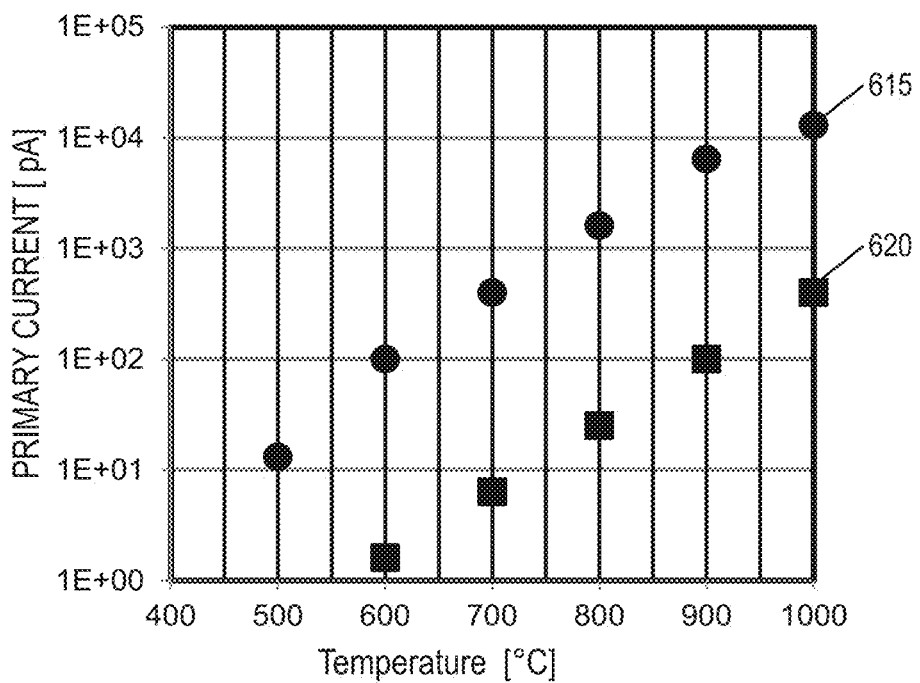
FIG. 6B is a current plot illustrating the influence of sample temperature on detected current in scintillator-based electron detectors for various detector configurations.

The data series for CBS detector 600, MD detector 605, and ICD detector 610 illustrate the monotonic increase in thermal noise with sample temperature. Distance from the sample reduces the relative influence of thermal photons on the noise signal, permitting BSE and or SE signals to exceed the thermal noise at a relatively lower primary current. Nonetheless, raising the sample temperature from about 100° C. to about 200° C. elicits an corresponding increase in primary current of one order of magnitude. This trend continues as temperature increases. It is noted that the data in FIGS. 6A and 6B are plotted on a logarithmic ordinate. As such, the influence of thermal noise on silicon-based detectors increases exponentially with temperature, although the plot appears as a linear trend.

FIG. 6B is a current plot illustrating the influence of sample temperature on signal detected by scintillation detector for two detector configurations. The data presented in the current plot of FIG. 6B were collected on a second SEM system, at 10 keV energy of the primary electrons for a series of operating temperatures. The data represent the beam current (e.g., current of primary electrons 190), plotted on the ordinate, above which the BSE and SE signal for a given detector exceeds the thermal noise signal at a given temperature, plotted on the abscissa. In this way, the sensitivity of scintillation detector to thermal photons emitted by the sample stage (e.g., sample stage 120 of FIG. 1A) is clearly shown. A first data series was collected for a series of temperatures between 500° C. and 1000° C. using an in-lens scintillation BSE detector nearer to the sample, referred to as the T1 detector 615. A second data series was collected for a series of temperatures between 600° C. and 1000° C. using a scintillation SE detector farther from the sample, referred to as the T2 detector 620.

The T1 detector 615 series and the T2 detector 620 series both demonstrate the sensitivity of scintillation detectors to thermal photons, at least in part because the primary current at which the signal-to-noise ratio equals one increases monotonically with stage temperature. The increasing thermal noise signal is compensated by increasing the BSE (or SE) signal through increasing the primary beam current. Increasing the primary beam current in this way, however, can damage the sample 125, induce surface charging that inhibits imaging, as well as other challenges.

FIGS. 7A-7F present a series of electron microscope images generated in an SEM at several sample temperatures using a doped silicon detector (FIGS. 7A, 7C, and 7E) and an example charged particle sensor of the present disclosure (FIGS. 7B, 7D, and 7F). The charged particle sensor used to generate FIGS. 7B, 7D, and 7F included diamond in the acceptor layer 215, characterized by a bandgap of about 5.5 eV, in contrast to the doped-silicon detector characterized by a bandgap of about 1.1 eV. The diamond material used in the detector that generated the images in FIGS. 7B, 7D, and 7F was polycrystalline diamond, fabricated using chemical vapor deposition.

The influence of thermal noise in BSE images is clearly demonstrated in the progressively increasing noise signal, manifested as detector saturation, in FIGS. 7A, 7C, and 7E, collected in an SEM using a doped silicon-based BSE detector. The first image, shown in FIG. 7A was collected with limited heating, or at ambient conditions, with a temperature of 308 K or 35° ° C. In reference to FIG. 5B, a doped-silicon BSE detector is not expected to detect a significant flux of thermal photons under such conditions.

The second and third images, shown in FIG. 7C and FIG. 7E were collected with moderate heating, at a temperature of 625 K or 352° C. and a temperature of 821 K or 448° C., respectively. In reference to FIG. 5B, a doped-silicon BSE detector is expected to be sensitive to less than 0.01% of thermal photons under such conditions. The sensitivity of silicon-based detectors to thermal photons is demonstrated in that significant sensor saturation is evidenced that is entirely or almost entirely absent from the corresponding images in FIG. 7D and FIG. 7F. Further, FIG. 7D and FIG. 7F were generated at significantly higher temperatures than those of FIG. 7C and FIG. 7E. In this way, it is apparent that a wide bandgap BSE detector exhibits superior properties that are shared with the silicon-based detector.

Advantageously, the insensitivity of the detector of FIGS. 7B, 7D, and 7F to thermal photons up to and exceeding temperatures of 1000 K permits heated samples to be imaged and/or analyzed using a BSE detector at a shorter working distance. As described in more detail in reference to FIGS. 6A-6B, silicon based detectors manifest a larger noise signal when positioned nearer to the sample stage. In this way, charged particle sensors of the present disclosure can access a larger solid angle of collection than silicon-based detectors, allowing for lower operating primary current (i.e. higher image resolution), faster imaging rates, and improved microanalysis performance (e.g., less damage to samples, better signal-to-noise, etc.) when using heated samples and in the presence of other energetic species.

FIGS. 8A-8F present a series of electron microscope images generated in an SEM at several sample temperatures using a doped silicon detector (FIGS. 8A, 8C, and 8E) and an example charged particle sensor of the present disclosure (FIGS. 8B, 8D, and 8F). As in FIGS. 7B, 7D, and 7F, the charged particle sensor used to generate FIGS. 8B, 8D, and 8F included diamond in the acceptor layer 215, characterized by a bandgap of about 5.5 eV, in contrast to the doped-silicon detector characterized by a bandgap of about 1.1 eV. The diamond material used in the detector that generated the images in FIGS. 8B, 8D, and 8F was polycrystalline diamond, fabricated using chemical vapor deposition. In contrast to the images generated in FIGS. 7A-7F, the sample stage used in FIGS. 8A-8F included an exposed micro-electrical heating circuit, As described in more detail in reference to FIGS. 4A-4C. The heating circuit is used to locally and rapidly heat the sample, which also accommodating one or more windows through the sample stage. As illustrated in FIG. 8A, particulate samples can be disposed on the heating circuit and extend at least partially over one of the windows. In this way, a particulate sample can be heated while also being imaged and/or analyzed in STEM mode (e.g., using SMD 165 configured sensors of the present disclosure).

The thermal mass of the heating circuit is relatively small, as compared to the heated stage used in FIGS. 7A, 7C, and 7E. For at least this reason, the flux of thermal photons is similarly reduced, resulting in a relatively higher temperature at which the silicon-based detector saturates in FIGS. 8A, 8C, and 8E. Even so, the corresponding images in FIGS. 8B, 8D, and 8F exhibit negligible or no sensor saturation that dominates FIGS. 8C and 8E up to and exceeding temperatures of about 1500 K. FIG. 8E further reveals the sensitivity of narrow-gap BSE detectors to relatively small changes in heating parameters. Over a difference of about 50 K, image saturation increases significantly between FIG. 8C and FIG. 8E. In contrast, negligible or no change is observed between FIG. 8D and FIG. 8F.

FIG. 9 is an efficiency plot illustrating the influence of beam energy on detection efficiency for example charged particle sensors, in accordance with some embodiments of the present disclosure. The example data provided in FIG. 9 was generated using a first sensor 900 including single-crystal diamond in the acceptor layer 215 and a second sensor 905 including polycrystalline diamond in the acceptor layer 215. For both datasets, charged particle sensors of the present disclosure are sensitive to charged particles (e.g., BSEs) having energies below 1 keV, including energies at about 100 eV or less. In contrast, scintillator-based detectors configured for use in analysis of heated samples (e.g., Robinson-type) are insensitive to charged particles below about 4 keV when configured with an aluminum layer or below about 1 keV when configured with a thin conductive layer or mesh instead of the aluminum layer, which implicates a relatively higher sensitivity to thermal noise. Advantageously, the sensors of the present disclosure can exhibit detector efficiency greater than about 30% at energies below 1 keV. Advantageously, combining the sensitivity of the sensors of the present disclosure to relatively low-energy charged particles with the insensitivity to thermal photons, based at least in part on the relatively wide bandgap of the acceptor layer 215, permits charged particle sensors of the present disclosure to outperform silicon-based and scintillator-based charged particle detectors (e.g., as BSE detectors or FSE detectors) in imaging and/or microanalysis of heated samples.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on electron microscopy systems, and SEM systems in particular, these are meant as non-limiting, illustrative embodiments. Embodiments of the present disclosure are not limited to such materials, but rather are intended to address charged particle beam systems for which a wide array of particles can be applied to imaging, microanalysis, and/or processing of materials on an atomic scale. Such particles may include, but are not limited to, electrons or ions in TEM systems, SEM systems, STEM systems, ion beam systems, and/or particle accelerator systems.

Some embodiments of the present disclosure include a system including one or more data processors and/or logic circuits. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. In an example, the aperture 235 of the charged particle sensor 200 can be "substantially aligned" with the beam axis A of the charged particle microscope 100, which can include a deviation from exact alignment resulting from physical phenomena affecting the beam of primary electrons 190 (e.g., beam drift resulting from changes in electromagnetic lens performance), in addition to or alternatively to deviations from exact alignment attributable to fabrication within tolerable limits. For dimensional values, such as diameters, lengths, widths, or the like, the term "about" can be understood to describe a deviation from the stated value of up to +10%. For example, a dimension of "about 10 mm" can describe a dimension from 9 mm to 11 mm. In the present disclosure, "sub-ranges" refers to a range of values between the two stated extents and/or including one of the two stated extents.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A charged particle sensor, comprising:
   a housing, configured to be incorporated into a scanning electron microscope (SEM); and
   a detector cell, mechanically coupled with the housing, the detector cell including:
   an acceptor layer including a semiconducting material characterized by a bandgap equal to or greater than about 2.0 eV, the acceptor layer defining a first surface and a second surface opposing the first surface;
   a first conducting layer disposed on the first surface;
   a second conducting layer disposed on the second surface;
   a first contact, electrically coupled with the first conducting layer; and
   a second contact, electrically coupled with the second conducting layer.

2. The charged particle sensor of claim 1, wherein the semiconducting material comprises sp3 hybridized carbon, characterized by a concentration of impurities equal to or less than about 5 ppb.

3. The charged particle sensor of claim 1, wherein the semiconducting material comprises one or more materials selected from a group consisting of silicon carbide, single crystalline diamond, polycrystalline diamond, gallium nitride, gallium phosphide, cadmium sulfide, aluminum phosphide, zinc selenide, zinc sulfide, or aluminum nitride.

4. The charged particle sensor of claim 1, wherein the housing is configured to be mechanically coupled with a pole piece of the SEM.

5. The charged particle sensor of claim 1, wherein the housing is configured to be mechanically coupled with the SEM such that the charged particle sensor is disposed in a beam column of the SEM and oriented to detect backscattered electrons.

6. The charged particle sensor of claim 1, wherein the acceptor layer is characterized by a thickness between the first conducting layer and the second conducting layer from about 10 µm to about 500 µm.

7. The charged particle sensor of claim 1, wherein the first contact and the second contact are electrically coupled with bias circuitry, being further configured to apply a bias voltage from about 0.1 V to about 5 kV across the acceptor layer.

8. The charged particle sensor of claim 1, defining an aperture, wherein: the detector cell is shaped to accommodate the aperture; and
   the aperture is characterized by a diameter from about 0.1 mm to about 5 mm.

9. The charged particle sensor of claim 1, wherein the detector cell is a first detector cell, the sensor further comprising a second detector cell, including:
   a second acceptor layer comprising the semiconductor material, the second acceptor layer defining a third surface and a fourth surface opposing the third surface;
   a third conducting layer disposed on the third surface and electrically isolated from the first conducting layer; and
   a third contact electrically coupled with the third conducting layer and electrically isolated from the first contact.

10. The charged particle sensor of claim 9, wherein the first detector cell and the second detector cell are disposed in a concentric arrangement.

11. A charged particle microscope system, comprising:
    a vacuum chamber;
    a sample stage disposed in the vacuum chamber, the sample stage being thermally coupled with a heating circuit; and
    a charged particle sensor, comprising a detector cell, the detector cell including:
    an acceptor layer including a semiconducting material characterized by a bandgap equal to or greater than about 2.0 eV, the acceptor layer defining a first surface and a second surface opposing the first surface;
    a first conducting layer disposed on the first surface;
    a second conducting layer disposed on the second surface;
    a first contact, electrically coupled with the first conducting layer; and a second contact, electrically coupled with the second conducting layer,
    wherein the first conducting layer is oriented toward the sample stage.

12. The microscope system of claim 11, wherein the semiconducting material comprises sp3 hybridized carbon, characterized by an impurity concentration equal to or less than about 5 ppb.

13. The microscope system of claim 11, wherein the semiconducting material comprises one or more materials selected from a group consisting of silicon carbide, single crystalline diamond, polycrystalline diamond, gallium nitride, gallium phosphide, cadmium sulfide, aluminum phosphide, zinc selenide, zinc sulfide, or aluminum nitride.

14. The microscope system of claim 11, further comprising bias circuitry, electrically coupled with the first contact and the second contact and configured to apply a bias voltage from about 0.1 V to about 5 kV across the acceptor layer.

15. The microscope system of claim 11, wherein the acceptor layer is characterized by a thickness between the first conducting layer and the second conducting layer from about 10 µm to about 500 µm.

16. The microscope system of claim 11, further comprising an objective lens disposed at least partially in the vacuum chamber, wherein:

the objective lens defines a beam axis between the sample stage and the objective lens, the beam axis further characterized by a scan angle over which the microscope system is configured to direct a beam of charged particles;

the charged particle sensor defines an aperture;

the detector cell is shaped to accommodate the aperture; and the aperture is characterized by a diameter from about 0.1 mm to about 5 mm.

17. The microscope system of claim 16, wherein the objective lens comprises a pole piece, and wherein the charged particle sensor is mechanically coupled with the pole piece.

18. The microscope system of claim 11, further comprising a beam column fluidically coupled with the vacuum chamber, wherein the charged particle sensor is disposed in the beam column.

19. The microscope system of claim 11, further comprising an objective lens disposed at least partially in the vacuum chamber, wherein:

the sample stage comprises one or more windows, the windows being configured to be at least partially transmissive of charged particles having an energy above the bandgap of the semiconducting material; and the sample stage is disposed between the objective lens and the charged particle sensor.

20. The microscope system of claim 11, wherein the detector cell is a first detector cell, the sensor further comprising a second detector cell, including:

a second acceptor layer comprising the semiconductor material, the second acceptor layer defining a third surface and a fourth surface opposing the third surface;

a third conducting layer disposed on the third surface and electrically isolated from the first conducting layer; and a third contact electrically coupled with the third conducting layer and electrically isolated from the first contact.

* * * * *